United States Patent Office 3,328,178
Patented June 27, 1967

3,328,178
METHOD OF STERILIZING
Gordon Alderton, Orinda, Calif., assignor to the United States of America as represented by the Secretary of Agriculture
No Drawing. Filed Jan. 27, 1964, Ser. No. 340,571
5 Claims. (Cl. 99—215)

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel processes for sterilizing materials, including processes for preserving substances such as foodstuffs which are normally subject to microbial spoilage. Further objects of the invention will be evident from the following description wherein parts and percentages are by weight unless otherwise specified.

The most common method of sterilizing involves subjecting the material in question to heat. Such technique is applied in many fields, for example, in preserving food products, in packaging drugs and surgical equipment, etc. Although the procedure is widely used, it is subject to certain disadvantages. A particular problem is that the degree of heating required to destroy the infesting microbial life, especially spores, often causes undesirable changes in the instrinsic properties of the substances in question. Depending on the composition of the substance being subjected to the heat sterilization, such deleterious changes may occur as for example: denaturation of proteins; degradation of starch or other high polymers into smaller fragments; hydrolysis of ester, peptide, and other structures susceptible to hydrolysis; decomposition of labile compounds such as vitamins, flavor components, etc. The problems which are encountered are particularly demonstrated by reference to canning of foods. The common canning method of preserving perishable foods involves placing the food in a sealed container—usually a can—and then subjecting the container and its contents to heat for an extended period of time. This method is effective and universally used but has the disadvantage that the combination of temperature and heating time adequate to destroy the microbial population of the foodstuff is deleterious to the foodstuff itself, because some forms of microbial life, particularly bacterial spores, are very resistant to heat. Modern processors use temperatures well above 212° F. and long periods of heating (as high as 60 to 200 minutes, or more) to insure adequate destruction of spores. For example, an authoritative canner's association recommends the following minimum heating times for processing vegetables in No. 2 cans at 240° F., namely: green beans, 20 min.; carrots, 30 min.; peas, 35 min.; corn, 50 min. As a result of such drastic heat treatment, the color, flavor, and texture of the product are necessarily adversely affected. Thus the majority of conventional canned foods are inferior in color, texture, and flavor to the fresh-cooked products. Another undesirable feature of the widely used canning process is the fact that live spores of thermophilic bacteria remain in the heat-processed product. If the product is then accidentally or, as in food vending machines, purposely held at thermophilic temperatures (50–80° C.), troublesome spoilage results from the germination and growth of these thermophiles. In general, considerations of product heat stability do not permit sufficiently severe heat processing to kill these thermophilic spores.

It is also generally known in the art that an acid condition during heat sterilization is beneficial as decreasing the thermal resistance of spores. Thus, at an acid pH, the spores are killed by a lesser degree of heating than would otherwise be the case. This phenomenon has been advantageously applied in canning foods. For example, an edible acid such as acetic acid is added to vegetable products, typically artichoke hearts, when they are canned so that sterility may be attained with a lesser degree of heating than would be the case with the vegetable at its natural pH. Although heat sterilization in the presence of an acid is advantageous in the respect noted above, it brings about certain disadvantages. One important point is that the flavor of the food product is changed; it has a sour taste because of the added acid. This is necessarily the case because the acid and food are sealed in a can and then subjected to sterilization whereby the acid remains with the food product in the sealed container. Another item is that packing the food in an acid condition brings about problems of can corrosion. As a consequence, ordinary cans are not suitable and one must use cans provided with special acid-resistant coatings or in extreme cases containers of glass or other acid-resistant material must be used. Another factor is that chemical changes in the substance being treated are encouraged by the combination of acid conditions plus elevated temperature. Thus many of the deleterious changes discussed above in connection with heat sterilization are magnified by the presence of the acid in combination with the heat of sterilization. Typical among these changes are those involving hydrolysis, for example: splitting of the peptide linkages in protein components; splitting of glycosidic linkages in starches, sugar, and other polysaccharides; splitting of ester groups in flavor or other components; decomposition of complex structures in dyes, pigments, vitamins, flavors, etc.

In accordance with the present invention, substances are sterilized by a procedure which obviates or at least substantially lessens the problems outlined above. A particular advantage of the invention is that sterilization is obtained by a relatively mild heat treatment whereby the possibility of hydrolysis or other deleterious changes taking place is substantially diminished or eliminated completely. Another advantage is that the original character of the material being processed in retained. For example, in treating foods in accordance with the invention, the product has the same pH characteristics as the original food. Another item is that the process of the invention is not subject to the problem of corrosion as involved in the prior technique of canning foods with added acid. Moreover, because the process of the invention facilitates the destruction of spores, including the spores of thermophilic organisms, the problems discussed above in connection with the occurrence of viable thermophilic spores in commercially-canned products are eliminated or at least substantially reduced.

Basically, the process of the invention involves these steps:

(1) The material in question is treated with an acid.
(2) The acid-treated material is restored to its original pH, as by neutralization with a base,
(3) The material is then subjected to a heat sterilization treatment.

The significance of these steps and their relation to certain principles not heretofore known are explained as follows:

My investigations on bacterial spores led to a finding that these spores exhibit cationic exchange properties analogous, for example, to those displayed by cation exchange resins of the polymethacrylic acid type. For example, by holding the spores in aqueous acid they will absorb the acid; that is, they will change to the hydrogen (acid) form. If then they are contacted with a cation such as $Ca^{++}$ or $Na^+$, particularly when applied at a neutral to alkaline pH, they will absorb the metal ions, i.e., the spores will change to the calcium or sodium salt forms, respectively. Moreover, I have found that the state of the spores, i.e., whether they are in the hydrogen form or in the salt form, makes a profound difference in their thermal sensitivity. Thus in general, the spores in the acid form display a low resistance to heat whereas in the salt form the spores display a high resistance to heat. Expressed another way, if the same heating conditions as to time and temperature are applied to both forms, many more of the spores in the acid form will be killed than those in the salt form. This important effect is illustrated by the following experimental observations:

Spores were isolated from a culture of *Bacillus megaterium*, using the technique of Sacks and Alderton, J. Bact., 82, 331, and dried in vacuum. The spores were then treated with dilute nitric acid at pH 4.0 to put the spores into the hydrogen form. Samples of these spores were then treated with various bases (sodium, calcium, and potassium hydroxide) to put them into the corresponding salt forms; a remaining sample of the spores in acid form was left as such. The treatments with the acid and the bases were done with 40-mg. portions of the spores in 4-ml. volumes of the treating solutions. The treatments were at 25° C. over a period of 3 hours, using a device (a "pH-Stat Titrator") which automatically maintains a constant, predetermined pH by adding more reagent as the treatment requires. To test the heat resistance of the treated spores, 3-mg. samples thereof suspended in 4 ml. of de-ionized water were heated at 80° C. for 30 minutes. The preparations were then quickly cooled and assayed for survivors by culturing them overnight at 35° C. on beet molasses agar and then counting the number of colonies which grew out. The results are tabulated below:

| Cation applied and pH of treatment solution | Amount of cation taken up by spores, milliequivalents/gram | Survivors after heating at 80° C., 30 min.*, colonies/gram of spores |
| --- | --- | --- |
| Ca, pH 9.5 | 0.7 | $6 \times 10^{11}$ |
| K, pH 9.5 | 0.8 | $2 \times 10^{11}$ |
| Na, pH 9.5 | 0.7 | $2 \times 10^{11}$ |
| Ca, pH 8.0 | 0.5 | $2 \times 10^{10}$ |
| Na, pH 8.0 | 0.5 | $1 \times 10^{10}$ |
| H, pH 4.0 | 0.5 | $1 \times 10^{7}$ |
| Untreated (control) | | $2 \times 10^{10}$ |

*Before heating there were $8 \times 10^{11}$ colonies/gram in each sample.

In the first step of the process of the invention, advantage is taken of the principle explained above. Thus, by the acid treatment the microbial spores adventitiously present on the substance being treated are put into a condition of reduced thermal resistance. Expressed in other words, they are sensitized to heat so that in a later stage of the process they can be destroyed by the application of less heat than that which would be required in the absence of the acid treatment.

In the second step of the process of the invention, the acid-treated material is restored to its original pH; for example, it is neutralized with a base. The significance of this step is that thereby the material is restored to its original condition or character. For example, in the case of a food the product will then have the same pH as it did originally and hence its original flavor will be restored. This step is also important in that it eliminates the problem of corrosion as encountered with prior methods which involve canning foods with added acid. A third point is that by restoration of original pH, there is no encouragement of hydrolysis or other deleterious changes as encountered where foods are canned with added acid and subjected to sterilization temperatures.

At this point it may well be asked why the neutralization does not vitiate the prior acid treatment by converting the spores to a salt form wherein they have high thermal resistance. The answer to this question involve the key concept of the present invention: Unexpectedly, I have found that the thermal sensitivity imparted to the spores persists even though the environment about the spores has been changed, i.e., is no longer acid. The reason for this presentence of thermal sensitivity is believed to involve the following factors: Although bacterial spores exhibit cation exchange ability, considerable time is involved for such exchange and this time is lengthened with decreasing temperature. Thus when the material is neutralized, the process of sorbing metal ions will be initiated but at such a rate that the material can readily be handled further without loss of the advantage of the acid treatment. Thus if the third step is applied at all expeditiously, no significant decrease in thermal sensitivity will have occurred. Naturally, it would not do to let the material sit around in the neutralized condition for days at rooom temperature as this would mullify the desired effect. However, if the material is subjected to a delay of not more than 1 or 2 hours at room temperature before further processing (i.e., heating), no harm will be done. In the event that the material is at a temperature above room temperature, it would be obviously desirable to initiate the next stage sooner. If for any reason it is necessary to hold the neutralized product, it can be refrigerated or frozen, in which case the rate of absorption of metal ions will be so slow that the effect of the acid treatment can be preserved for long periods. The temperature-dependent nature of the re-gain of heat resistance is illustrated by the following: Spores of *Bacillus megaterium* were treated with an acid to produce the hydrogen form of the spores. These were then held at various temperatures—18° C., 25° C., and 50° C.—in alkaline buffer solutions at pH 7.9 containing calcium ions. The thermal resistance of the spores was then determined. It was found that there was no detectable increase in thermal resistance after holding at 18° C. for 5 hours; it took about 3 days for maximum regain of thermal resistance at this temperature. At 25° C., there was a 1% increase in thermal resistance in one hour; total regain took about 1 day. At 50° C., maximum regain of thermal resistance took about 2 hours.

In sum, my finding that the acid-induced heat sensitivity of bacterial spore *persists* is the key point of the invention which permits one to attain steriality with a relatively mild heat treatment and in an environment less acid than that used to induce the heat sensitivity.

The practice of the invention is explained in more detail as follows:

(I) In the first step the material to be sterilized is contacted with an acid. The nature of the acid is not material since its only function is to supply hydrogen ions. Obviously, where food materials are being handled, one would select a nontoxic acid. Typical acids which may be employed are for example nitric, hydrochloric, sulphuric, phosphoric, hydrobromic, trichloroacetic, acetic, chloroacetic, fumaric, maleic, salicylic, tartaric, etc. Acid salts such as sodium bisulfate may also be used. Hydrochloric acid is generally preferred as on neutralization with sodium carbonate or hydoxide (in the second step) there is formed ordinary salt—a common ingredient of foods. The acid is applied in aqueous solution and at a concentration to provide an acidic pH. Low pH's are desirable to expedite the treatment and generally a pH of about 1.5 to 5 is preferred. The formation of the hydrogen form of the spores—or, stripping, as it is termed herein—takes place relatively slowly and sufficient time must be allowed for the desorption of metal ions naturally present on the spores. This rate is further dependent on temperature so that, for example, whereas extensive stripping will be obtained in about 1 to 5 hours at 50° C., the same degree of stripping at 25° C. will require anywhere from 1 to 10 days. Also, the concentration and valence of metal cations which are present in the material are factors influencing the rate of stripping. For example, polyvalent metal cations such as Ca and Mg take a longer time and/or a lower pH to strip than monovalent cations such as Na and K. A higher concentration of metal cations will also require a longer time of stripping. In any particular case, thermal death trials may be run from time to time during the acid stripping operation to determine when an effective decrease in heat resistance has been achieved. Taking into account the various factors mentioned above, the acid stripping is continued for a period long enough to obtain such a degree of stripping that the termal resistance is markedly decreased, this time being anywhere from 1 hour to 10 days, depending on the circumstances. The acid stripping may be conducted at room temperature (25° C.) or above. Since the rate of stripping increases with increasing temperature, it is preferred to use as high a temperature short of damaging the material being treated. It is to be noted that the process of the invention does not depend on any ability of the acid per se to destroy microbial forms. Thus the acid treatment by itself exhibits little if any ability to destroy spores on contact. The function of the acid is to put the spores into a condition wherein their thermal resistance is lowered. However, it is obvious that if the acid stripping is conducted at a high enough temperature there will be spore destruction at this stage. Such spore destruction is, however, merely an incident to the main function of the acid treatment as described above and the process of the invention is operative even when the acid treatment is conducted at sub-lethal temperatures.

(II) After the material has been contacted with acid to obtain the desired stripping effect, it is treated to restore it to substantially its original pH. The neutralization is generally accomplished by adding a base. The particular base to be used is not critical but preferably a base of a monovalent metal such as sodium or potassium is employed. Obviously in treating food products, one would select a non-toxic base. Typical of the bases which are used are sodium hydroxide, calcium hydroxide, potassium hydroxide, sodium or potassium carbonate or bicarbonate, disodium phosphate, etc. The amount of base used is that required to restore the material to substantially its original pH. In the case of solid materials, particularly those with relatively impervious surfaces, the acid removal can be effected by simply withdrawing the material from the acid solution and washing it with water to eliminate residual acid.

(III) In the next step the neutralized material is subjected to heat treatment to destroy the spores which are now in a heat labile condition (plus, of course, to destroy whatever vegetative microbial forms are present on the material). Ordinarily, the material is sealed in a container prior to heat treatment thus to prevent reinfection of the sterilized product with microbial forms from the environment. Thus, for example, in preserving foods in accordance with the invention, the food is treated with acid and neutralized as above described and then sealed in a can or other container and the container and contents subjected to a heat treatment. The temperature and time for heating the material will vary, depending on such factors as the effectiveness of heat transfer attained, the nature and previous history of the material, the types of microorganisms with which it is infected and the amount of adventitious microflora. For example, in the preservation of foods in accordance with the invention such items as low pH of the food and good sanitary condition of the food make for a lesser degree of heat treatment. Also as in conventional canning, one must take into account the size of the container since with larger containers one must allow more time for penetration of heat into the interior than with a smaller container. For best results, it is preferred to use a system wherein the material is brought up to high temperature in as short a time as possible whereby to minimize any possibility of the spores taking up metal cations during the period that the material is heating up. For this reason, programs which involve high temperature and short time are preferred to those of relatively lower temperatures for longer periods. In any event, the degree of heat processing will be substantially less than with conventional sterilization. Thus, by rendering the spores sensitive to heat, as hereinabove described, the temperature or heating time or both will be substantially less than with conventional sterilization. In any particular case the minimum heat processing treatment can be ascertained by running pilot experiments in which containers of the material to be preserved are subjected to varying conditions of temperature and time followed by microbiological examinations to determine the minimum heating levels required to ensure production of a sterile product. Since the temperature and heating time are influenced by so many factors, it is impossible to set forth any numerical limits on these conditions. The heating conditions can best be described as heating at a temperature and for a time sufficient to render the material essentially sterile, the combination of temperature and time of heating required to achieve this end being substantially less than would be required in the absence of the treatment which renders the spores sensitive to heat.

The process of invention is of wide versatility and can be applied to materials of every type. A typical application of the invention is in the preservation of foodstuffs, for example, fruits, vegetables, milk, eggs, meat, spices, fish, cereal products, cheeses, and so forth. Liquid foods such as juices, purees, concentrates, sauces, soups, extracts, and beverages of every type are included.

Although the invention is particularly adapted for the preservation of foods, it may also be applied for the preservation of any substance which is normally susceptible to microbial spoilage. Thus, for example, the invention may be applied for the preservation of such substances as animal glues and mucilages; dextrins; starch pastes and solutions; cosmetic, medicinal, and dental preparations; vitamin preparations; pastes, solutions, or other preparations of natural gums such as tragacanth, arabic, acacic, karaya, locust bean, agar-agar, pectin, algin, etc.; fermentation broths, mashes, and residues from fermentation processes; whey; wines; animal feeds and ingredients of animal feeds such as fish meals, blood meals, feather meal, meat scraps, bone meal, tankage, grains, and oil-seed meals; proteins and protein hydrolysates; textile printing pastes; paints containing proteins or other spoilable dispersing agents; solutions of bark extracts or other tanning agents; molasses; by-products or wastes that contain potentially valuable carbohydrate, proteinous or fat ingredients such as stick liquor, corn steep liquor, fruit cannery wastes, citrus peels, cull fruit and vegetables, tops of root vegetables, distillers' slops, pulp liquors, wash water from textile de-sizing operations, waste liquors from wool scouring plants, dairy and slaughter house wastes and liquors, etc.

The invention may be also applied to materials such as bandages, sutures, needles and surgical devices and instruments of all types; implements used in microbiological and pharmacological investigations, for example, culture media, test tubes, petri dishes, animal cages, etc.

The invention is further demonstrated by the following examples. In these examples, the material being treated was deliberately inoculated with certain microorganisms. This was done to demonstrate the efficacy of the treatment. It is obvious that in a practice of the invention for practical purposes, the material would not be so inoculated. Also, in all the examples the conditions of stripping were deliberately chosen to be mild enough so that no spore killing took place during the acid treatment. This was done so that the inoculum levels (number of live spores) in each treatment would be the same. This was required with these comparative experiments because the time to heat sterilize depends on the *number* of spores. Obviously in a practice of the invention under circumstances where no comparison with controls is involved, it would not be necessary to restrict the conditions of stripping to such levels.

Example 1

Fresh frozen peas were thawed, pureed, heated at 100° C. for one hour and centrifuged. The separated juice was filtered and autoclaved for 20 minutes under a steam pressure of 15 lbs. per sq. in. to provide a sterile, clear pea juice.

One portion of the pea juice was acidified to pH 2.5 by addition of hydrochloric acid (136 ml. juice to 9 ml. of 1.02 N HCl). Also, spores of *Bacillus stearothermophilus* were added to provide a level of one million spores per ml. The mixture was allowed to stand overnight (about 16 hrs.) at room temperature. The next day the acid treated, inoculated pea juice was treated with sufficient 1 N sodium hydroxide to restore it to its original pH of 6.0.

Another portion of the pea juice was inoculated with the same amount of the spores but without acidification, thus to provide a control. This was kept cool to prevent germination of spores. To provide comparative conditions, an equivalent amount of water and salt (NaCl) was added to the control.

Two-ml. portions of the treated juice and control juice were sealed into thermal death time tubes and these were heated for various times in an oil bath maintained at 120.6° C. There were ten tubes for each of the juices and for each time of heating. After heating, the tubes were cooled quickly and each was plated on glucose-tryptone agar. After incubation at 55° C. for 6 days the colonies on each plate were counted. The results are tabulated below:

| Sample | Heating time, min. | Results |
| --- | --- | --- |
| Acid treated and neutralized | 10 | 2 plates had 2 colonies each. 8 plates had no colonies. |
| Do | 15 | No colonies on any of the plates. |
| Control | 20 | All 10 plates had 20–50 colonies each. |
| Do | 25 | 3 plates had one colony each. 7 plates had no colonies. |
| Do | 30 | No colonies on any of the plates. |

Example 2

The procedure set forth in Example 1 was repeated with these changes:

(1) The inoculating spores were those of the putrefactive anaerobe Clostridium sp. PA 3679, an organism commonly used in evaluating food sterilization processes. The stripping was at 42° C.

(2) The heating was at 115.5° C.

(3) The tests for survivors were conducted in the following manner. The thermal death time tubes were quickly cooled after removal from the heating bath and each emptied into a test tube containing pea-pork agar. After solidification of this medium, 1 inch of thioglycolate agar was poured on top of it and then there was added 2 ml. of hot petroleum jelly containing ⅓ part of paraffin. All this was done to preserve anaerobic conditions in the pea-pork medium. The tubes were incubated at 30° C. for 25 days. The tubes were then examined for microbial growth which is indicated by gas formation, the gas pushing the paraffin plug out of the tube. The results are tabulated below:

| Sample | Heating time, min. | Results |
| --- | --- | --- |
| Acid treated and neutralized | 15 | 2 tubes blown. 8 tubes not blown. |
| Do | 20 | No blown tubes. |
| Control | 25 | 1 tube blown, 2 tubes have small colonies. 7 tubes not blown. |
| Do | 30 | No tubes blown. |

Example 3

The procedure of Example 1 was repeated with these changes:

(1) The inoculation was with spores of *Bacillus subtilis* 15 U.

(2) The heating was at 111.5° C.

(3) Tests for survivors were made by plating on nutrient agar containing dextrose and soluble starch. After incubating at 35° C. for 5 days the colonies on each plate were counted.

The results are tabulated below:

| Sample | Heating time, min. | Results |
| --- | --- | --- |
| Acid treated and neutralized | 15 | 3 plates had 1 to 4 colonies each. 2 plates had no colonies. |
| Do | 20 | 4 plates had one colony each. 6 plates had no colonies. |
| Do | 25 | No colonies on any of the plates (10). |
| Control | 40 | 4 plates had 2 colonies each. 6 plates had no colonies. |
| Do | 45 | 2 plates had one colony each. 8 plates had no colonies. |
| Do | 50 | No colonies on any of the plates (10). |

Example 4

The process of Example 1 was repeated with these changes:

(1) The material treated was commercial pureed peas.

(2) The inoculation was with spores of *Bacillus subtilis* 15 U.

(3) The heating was at 109.8° C. for limited times to obtain the death rates with no attempt to attain sterility.

(4) Assay of survivors was made by plating on nutrient agar containing dextrose and soluble starch. After incubation at 35° C. for 4 days, the colonies on each plate were counted.

The results of the plate counts are tabulated below:

| Sample | Survivors, colonies/gram of spores | | |
| --- | --- | --- | --- |
| | Before heating | Heated 10 min. | Heated 25 min. |
| Acid treated and neutralized | $10^{12}$ | 2,200,000 | 100,000 |
| Control | $10^{12}$ | 10,000,000,000 | 35,000,000 |

Example 5

The procedure of Example 1 was repeated with this change:

The heating was at 121.6° C. for limited times to obtain the death rate with no attempt to obtain serility.

The results are tabulated below:

| Sample | Survivors, colonies/gram of spores | | | |
| --- | --- | --- | --- | --- |
| | Before heating | Heated 2.5 min. | Heated 5 min. | Heated 10 min. |
| Acid treated and neutralized | $1 \times 10^8$ | n.d.* | $4 \times 10^2$ | n.d. |
| Control | $1 \times 10^7$ | $2.9 \times 10^8$ | $7.8 \times 10^7$ | $2 \times 10^5$ |

*n.d.=not determined.

Having thus described the invention, what is claimed is:

1. A method for sterilizing a material contaminated with microbial spores which comprises contacting the material with an acid in a concentration insufficient per se to cause any substantial direct destruction of the spores, maintaining the material in contact with said acid for a period sufficient to obtain stripping of metal ions from the spores whereby to cause a substantial reduction in the thermal resistance of the spores, restoring the acid-treated material to substantially its original pH, and without any substantial delay subjecting it to heat at a temperature and for a time sufficient to produce an essentially sterile product, the combination of temperature and time of heating being substantially less than would be required to attain sterility in the absence of said acid treatment.

2. A method for preserving a material normally subject to microbial spoilage which comprises contacting the material with an acid in a concentration insufficient per se to cause any substantial direct destruction of contaminating spores and insufficient to cause any material damage to the material, maintaining the material in contact with said acid for a period sufficient to obtain stripping of metal ions from the contaminating spores whereby to cause a substantial reduction in the thermal resistance of the spores, neutralizing the acid-treated material to restore it to substantially its original pH, and without any substantial delay subjecting it to heat at a temperature and for a time sufficient to produce an essentially sterile product, the combination of temperature and time of heating being substantially less than would be required to attain sterility in the absence of said acid treatment.

3. The process of claim 2 wherein said material is a food.

4. A method for reducing the severity of heat treatment required to preserve a material against microbial spoilage which comprises applying to the material, prior to subjecting it to heat treatment, the following treatment: (a) Contacting the material with acid at a concentration insufficient per se to cause any direct destruction of contaminating spores and insufficient to damage the material, continuing said contact for a time sufficient to render the contaminating spores sensitive to heat, (b) neutralizing the acid-treated material to about its original pH, and thereafter applying said heat treatment to the material, the contaminating spores on which persist in a heat sensitive state.

5. A method for sterilizing a material contaminated with microbial spores which comprises contacting the material with acid under conditions insufficient to cause any direct destruction of the spores and insufficient to damage the material but sufficient to encourage stripping of metal ions from the spores whereby to reduce their thermal resistance, maintaining the material in contact with the acid for a period sufficient to obtain a substantial reduction in thermal resistance of the spores, neutralizing the acid-treated material to about its original pH, and without any substantial delay subjecting it to heat at a temperature and for a time sufficient to produce an essentially sterile product, the combination of temperature and time of heating being substantially less than would be required to attain sterility in the absence of said acid treatment.

No references cited.

A. LOUIS MONACELL, *Primary Examiner.*

M. VOET, *Assistant Examiner.*